(12) United States Patent
Li et al.

(10) Patent No.: US 10,651,919 B2
(45) Date of Patent: May 12, 2020

(54) DIVERSITY RECEIVER AND TERMINAL

(71) Applicant: Huawei Technologies Co., Ltd., Shenzhen, Guangdong, P.R. (CN)

(72) Inventors: Weinan Li, Shanghai (CN); Xiaoran Li, Shanghai (CN); Jian Liang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/267,808

(22) Filed: Feb. 5, 2019

(65) Prior Publication Data
US 2019/0173564 A1 Jun. 6, 2019

Related U.S. Application Data

(63) Continuation of application No. PCT/CN2017/096507, filed on Aug. 8, 2017.

(30) Foreign Application Priority Data

Aug. 8, 2016 (CN) .......................... 2016 1 0643388

(51) Int. Cl.
*H04L 1/02* (2006.01)
*H04B 7/08* (2006.01)
(Continued)

(52) U.S. Cl.
CPC ......... *H04B 7/0825* (2013.01); *H04B 1/1036* (2013.01); *H04B 1/525* (2013.01); *H04B 7/08* (2013.01)

(58) Field of Classification Search
CPC ........ H04B 1/525; H04B 1/109; H04B 1/123; H04B 7/0825; H04B 1/7093; H04L 7/042; H04L 27/2662
(Continued)

(56) References Cited

U.S. PATENT DOCUMENTS

| | | | |
|---|---|---|---|
| 6,535,748 B1 | 3/2003 | Vuorio et al. | |
| 2003/0145328 A1* | 7/2003 | Rabinowitz | G01S 5/0036 725/72 |

(Continued)

FOREIGN PATENT DOCUMENTS

| | | |
|---|---|---|
| CN | 1237866 A | 12/1999 |
| CN | 101202581 A | 6/2008 |

(Continued)

*Primary Examiner* — Khai Tran
(74) *Attorney, Agent, or Firm* — Leydig, Voit & Mayer, Ltd.

(57) ABSTRACT

The present application discloses a diversity receiver and a terminal. The diversity receiver includes a first main channel and a first diversity channel, the first main channel includes an antenna diplexer and a first main transmission channel, and the first diversity channel includes a tunable bandpass filter and a first diversity receiving channel. The first diversity receiving channel is coupled to a diversity antenna by using the tunable bandpass filter, and the tunable bandpass filter is configured to: adjust a passband bandwidth of the tunable bandpass filter according to a band bandwidth of a first transmit signal generated by the first main transmission channel and a band bandwidth of a first receive signal received from the diversity antenna, and perform bandpass filtering based on the passband bandwidth on the first receive signal.

19 Claims, 9 Drawing Sheets

(51) Int. Cl.
*H04B 1/525* (2015.01)
*H04B 1/10* (2006.01)
(58) Field of Classification Search
USPC .......................................................... 375/347
See application file for complete search history.

(56) References Cited

U.S. PATENT DOCUMENTS

| | | |
|---|---|---|
| 2011/0149714 A1 | 6/2011 | Rimini et al. |
| 2011/0299575 A1* | 12/2011 | Aoulad Ali ............ H04B 1/525 |
| | | 375/219 |
| 2012/0140685 A1 | 6/2012 | Lederer et al. |
| 2012/0140860 A1 | 6/2012 | Rimini et al. |
| 2012/0263077 A1 | 10/2012 | Xu et al. |
| 2012/0302188 A1 | 11/2012 | Sahota et al. |
| 2013/0044791 A1 | 2/2013 | Rimini et al. |
| 2013/0155911 A1 | 6/2013 | Kahrizi et al. |
| 2015/0087245 A1 | 3/2015 | Hadji-Abdolhamid et al. |
| 2015/0171955 A1 | 6/2015 | Olesen et al. |
| 2015/0200721 A1 | 7/2015 | Hwang et al. |
| 2015/0358041 A1* | 12/2015 | Li ........................ H04B 1/1036 |
| | | 455/188.1 |
| 2016/0126990 A1 | 5/2016 | Leipold et al. |
| 2017/0302317 A1 | 10/2017 | Horita et al. |

FOREIGN PATENT DOCUMENTS

| | | |
|---|---|---|
| CN | 101741441 A | 6/2010 |
| CN | 102104390 A | 6/2011 |
| CN | 102611651 A | 7/2012 |
| CN | 103166666 A | 6/2013 |
| CN | 103563261 A | 2/2014 |
| CN | 104113356 A | 10/2014 |
| CN | 104427656 A | 3/2015 |
| CN | 105141335 A | 12/2015 |
| CN | 204967861 U | 1/2016 |
| CN | 106301516 A | 1/2017 |
| EP | 0966115 A2 | 12/1999 |
| WO | 2016/104234 A1 | 6/2016 |

\* cited by examiner

--Prior Art--

DIVERSITY RECEIVER AND TERMINAL

CROSS-REFERENCE TO RELATED APPLICATIONS

This application is a continuation of International Application No. PCT/CN2017/096507 filed on Aug. 8, 2017, which claims priority to Chinese Patent Application No. 201610643388.6 filed on Aug. 8, 2016. The disclosures of the aforementioned applications are hereby incorporated by reference in their entireties.

TECHNICAL FIELD

The present application relates to the communications field, and in particular, to a diversity receiver and a terminal.

BACKGROUND

Currently, because a frequency division duplex (FDD) technology can support a transmitter and a receiver in separately working on different bands, the FDD technology is widely applied to various wireless communications devices. However, in a communications device using the FDD technology, a transmit (TX) signal is leaked to a receiving channel on which a receiver is located. A non-linear characteristic of each device in the receiver results in second-order intermodulation distortion (IMD2) interference. Such interference is typical self-interference.

As shown in FIG. 1, in an antenna diversity receiver, a main channel usually includes a main receiving channel (11→21→30) and a main transmission channel (30→22→21→11) that include a main antenna 11, an antenna diplexer 21, a power amplifier 22, and a mixer circuit integrated into a transceiver 30. A transmit signal transmitted on the main transmission channel (30→22→21→11) is leaked to the main receiving channel (11→21→30). To avoid interference caused by signal leakage of the main transmission channel to the main receiving channel (11→21→30), a common solution is performing second-order intermodulation intercept point (IP2) calibration on a main channel in a manufacturing line, to avoid IMD2 interference from the main transmission channel to the main receiving channel. However, for a diversity channel including a diversity antenna 12, a filter 23, and the mixer circuit integrated into the transceiver 30, the diversity channel is configured only to receive a signal but not to transmit a signal. Therefore, IP2 calibration cannot be performed in a wired environment. A common practice is using a default IP2 calibration code word to perform IP2 calibration, or directly using an IP2 calibration code word used when IP2 calibration is performed on the main channel. In addition, a surface acoustic wave (SAW) filter with a relatively high suppression degree and a fixed frequency needs to be used in the diversity channel to suppress signal leakage. In this calibration method, receive performance of the diversity channel of the diversity receiver cannot meet a requirement. In addition, this method goes against a high requirement of a mobile terminal that supports multiband receiving for a miniaturized and low-cost radio frequency subsystem.

SUMMARY

This specification describes an antenna diversity receiver and a terminal, so as to improve receive performance of the diversity receiver, and meet a requirement for miniaturization and low costs.

According to a first aspect, an embodiment of the present application provides a diversity receiver. The diversity receiver includes a first main channel and a first diversity channel. The first main channel includes an antenna diplexer and a first main transmission channel, the first main transmission channel is coupled to a main antenna by using the antenna diplexer, and the first main transmission channel is configured to: generate a first transmit signal according to a first baseband signal, and send the first transmit signal to the main antenna by using the antenna diplexer. The first diversity channel includes a tunable bandpass filter and a first diversity receiving channel, and the first diversity receiving channel is coupled to a diversity antenna by using the tunable bandpass filter. The tunable bandpass filter is configured to: adjust a passband bandwidth of the tunable bandpass filter according to a band bandwidth of the first transmit signal and a band bandwidth of a first receive signal received from the diversity antenna, and perform bandpass filtering based on the passband bandwidth on the first receive signal, so as to suppress signal leakage caused by the first transmit signal to the first receive signal. The first diversity receiving channel is configured to generate a second baseband signal according to the filtered first receive signal. According to the diversity receiver provided in this embodiment of the present application, when an operating band of the first main channel changes within a specified range, transmit signal leakage can be suppressed by using a diversity channel including the tunable bandpass filter, thereby simplifying a structure of the diversity receiver, and helping implement miniaturization.

In a possible design, the tunable bandpass filter may be configured to set the passband bandwidth of the tunable bandpass filter as a channel bandwidth of the first receive signal. The passband bandwidth of the tunable bandpass filter is narrowed, so that a band of the first transmit signal is further far from a passband of the tunable bandpass filter. This improves a capability of suppressing leakage of the first transmit signal.

In a possible design, the first main channel further includes a first main receiving channel, and the first main receiving channel is configured to generate a third baseband signal according to a second receive signal received from the main antenna, where the third baseband signal and the second baseband signal are a pair of diversity receive signals.

In a possible design, each of the first main transmission channel, the first main receiving channel, and the first diversity receiving channel is one of a zero intermediate frequency channel, a low intermediate frequency channel, or a superheterodyne channel.

In a possible design, the first main transmission channel may include a power amplifier, a first frequency mixer, a first oscillator, a first low-pass filter, and a digital-to-analog converter. The first main receiving channel may include a first low-noise amplifier, a second frequency mixer, a second low-pass filter, a first analog-to-digital converter, and a second oscillator. The first diversity receiving channel may include a second low-noise amplifier, a third frequency mixer, a third low-pass filter, a second analog-to-digital converter, and the second oscillator. The second low-noise amplifier in the first diversity receiving channel is coupled to the diversity antenna by using the tunable bandpass filter.

According to the foregoing possible design, in a possible design, the antenna diplexer, the power amplifier, the tunable bandpass filter, and the like are encapsulated as a radio frequency front-end circuit. The first frequency mixer, the first oscillator, the first low-pass filter, the digital-to-analog converter, the first low-noise amplifier, the second frequency mixer, the second low-pass filter, the first analog-to-digital converter, the second low-noise amplifier, the third frequency mixer, the third low-pass filter, the second analog-to-digital converter, the second oscillator, and the like are encapsulated as a transceiver.

In a possible design, the diversity receiver may further include a controller. The controller is configured to control, according to the band bandwidth of the first transmit signal processed by the first main transmission channel and a band bandwidth of the second receive signal received on the first diversity receiving channel, the tunable bandpass filter to adjust the passband bandwidth of the tunable bandpass filter, so as to filter out a part of signal leaked from the first transmit signal to the first diversity receiving channel.

In a possible design, the controller may be encapsulated into the radio frequency front-end circuit, so as to improve an integration degree of the diversity receiver, and reduce an area of a printed circuit board.

In a possible design, the diversity receiver further includes an adaptive filter. The adaptive filter is separately coupled to the first main transmission channel and the first diversity receiving channel, and the adaptive filter is configured to: construct, by using the first baseband signal received on the first main transmission channel and by performing an adaptive filtering algorithm, a second-order intermodulation distortion IMD2 interference signal generated because of signal leakage of the first baseband signal to the first diversity receiving channel, and filter out the IMD2 interference signal from the second baseband signal generated by the first diversity receiving channel. Because an outband suppression degree of the tunable bandpass filter is usually lower than that of a SAW filter, interference suppression performance cannot meet a requirement. This embodiment of the present application provides the adaptive filter. The adaptive filter is used together with the tunable bandpass filter to filter out, in a digital domain, a signal of interference caused by signal leakage of the first baseband signal to the first diversity receiving channel, so that the first diversity receiving channel can output the second baseband signal that does not include IMD2 interference. This further improves interference suppression performance of the diversity receiver.

In a possible design, the adaptive filtering algorithm includes at least one of a least mean square LMS algorithm or a recursive least square RLS algorithm.

In a possible design, the adaptive filter is specifically configured to: use the first baseband signal as a reference signal, synchronize the reference signal with the second baseband signal, and construct the IMD2 interference signal according to the following formula:

$$IMD2 = \sum_{i=1}^{n} S_i(I_i^2 + Q_i^2) + \sum_{i=1,j=1}^{n} C_{ij}(I_iI_j + Q_iQ_j) + \sum_{i=1,j=1}^{n} nC_{ij}(I_iI_j - Q_iQ_j) + DC,$$

where IMD2 represents the constructed IMD2 interference signal, $I_i$ represents an i-order in-phase component of the reference signal obtained after the synchronization, $Q_i$ represents an i-order quadrature component of the reference signal obtained after the synchronization, $I_j$ represents a j-order in-phase component of the reference signal obtained after the synchronization, $Q_j$ represents a j-order quadrature component of the reference signal obtained after the synchronization, $S_i$ is an autocorrelation coefficient, $C_{ij}$ is a cross coefficient, $nC_{ij}$ is a negative cross coefficient, and DC represents a direct current term, where i and j are natural numbers, $i \leq n$, $j \leq n$, and $i \neq j$.

In a possible design, the diversity receiver includes multiple main channels and a main switch, and the main switch is configured to select one of the multiple main channels as the first main channel.

In a possible design, the diversity receiver includes multiple diversity channels and a diversity switch, and the diversity switch is configured to select, from the multiple diversity channels according to the first main channel determined by the main switch, one diversity channel matching the first main channel to serve as the first diversity channel, where a filtering range of a tunable bandpass filter in the diversity channel selected by the diversity switch does not overlap a transmit band of the first main channel, but matches a receive band of the first main channel.

According to another aspect, an embodiment of this application further provides a terminal. The terminal includes the diversity receiver described in the embodiment of the previous aspect and a processor coupled to the diversity receiver. The processor is configured to: generate the first baseband signal, and transmit the first baseband signal to the diversity receiver. The processor is further configured to perform diversity receiving on the second baseband signal generated by the diversity receiver. According to the diversity receiver used by the terminal provided in this embodiment of the present application, one diversity channel including a tunable bandpass filter may be used to replace multiple diversity channels including a SAW filter to suppress transmit signal leakage, thereby helping simplify a design of the diversity receiver. In addition, costs can be reduced because a quantity of devices is deceased.

In a possible design, the terminal further includes the main antenna and the diversity antenna, and the main antenna and the diversity antenna are separately coupled to the diversity receiver.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DETAILED DESCRIPTION

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are some rather than all of the embodiments of the present application. All other embodiments obtained by a person of ordinary skill in the art based on the embodiments of the present application without creative efforts shall fall within the protection scope of the present application.

In the embodiments of the present application, the word such as "example" or "for example" is used to represent giving an example, an illustration, or a description. Any embodiment or design scheme described as an "example" or "for example" in the embodiments of the present application should not be explained as being more preferred or having more advantages than another embodiment or design scheme. Exactly, use of the word such as "example" or "for example" is intended to present a related concept in a specific manner.

Figure 1:
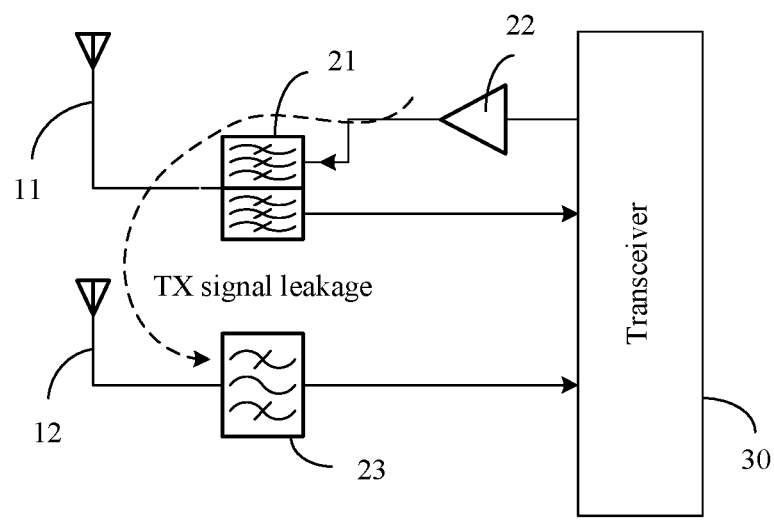
FIG. 1 is a schematic diagram of signal leakage of a diversity receiver.

To facilitate better understanding of the technical solutions in the present application, an antenna diversity receiving technology is first briefly described. Diversity receiving is a receive mode in which a receiver separately receives, by using attenuation incoherence generated when electromagnetic waves have a great enough difference in space, frequency, polarization, and time, multiple statistically-independent attenuated signals that carry same information, and then combines the received multiple statistically-independent attenuated signals, to reduce impact of signal attenuation and obtain a stable signal. In an antenna diversity receiver shown in FIG. 1, radio frequency signals separately received from a main antenna 11 and a diversity antenna 12 are separately converted into baseband signals by using a down-conversion circuit in a transceiver 30, and then signal processing such as demodulation, decoding, and combining is performed in a processor (not shown herein), to obtain information carried in these radio frequency signals. A person skilled in the art should know that down conversion means that a radio frequency signal is converted into an intermediate frequency signal or a baseband signal by means of frequency mixing. Correspondingly, up conversion means that a baseband signal or an intermediate frequency signal is converted into a radio frequency signal by means of frequency mixing. An up-conversion circuit and a down-conversion circuit have been fully described in the prior art. For details, refer to the prior art.

Figure 2:
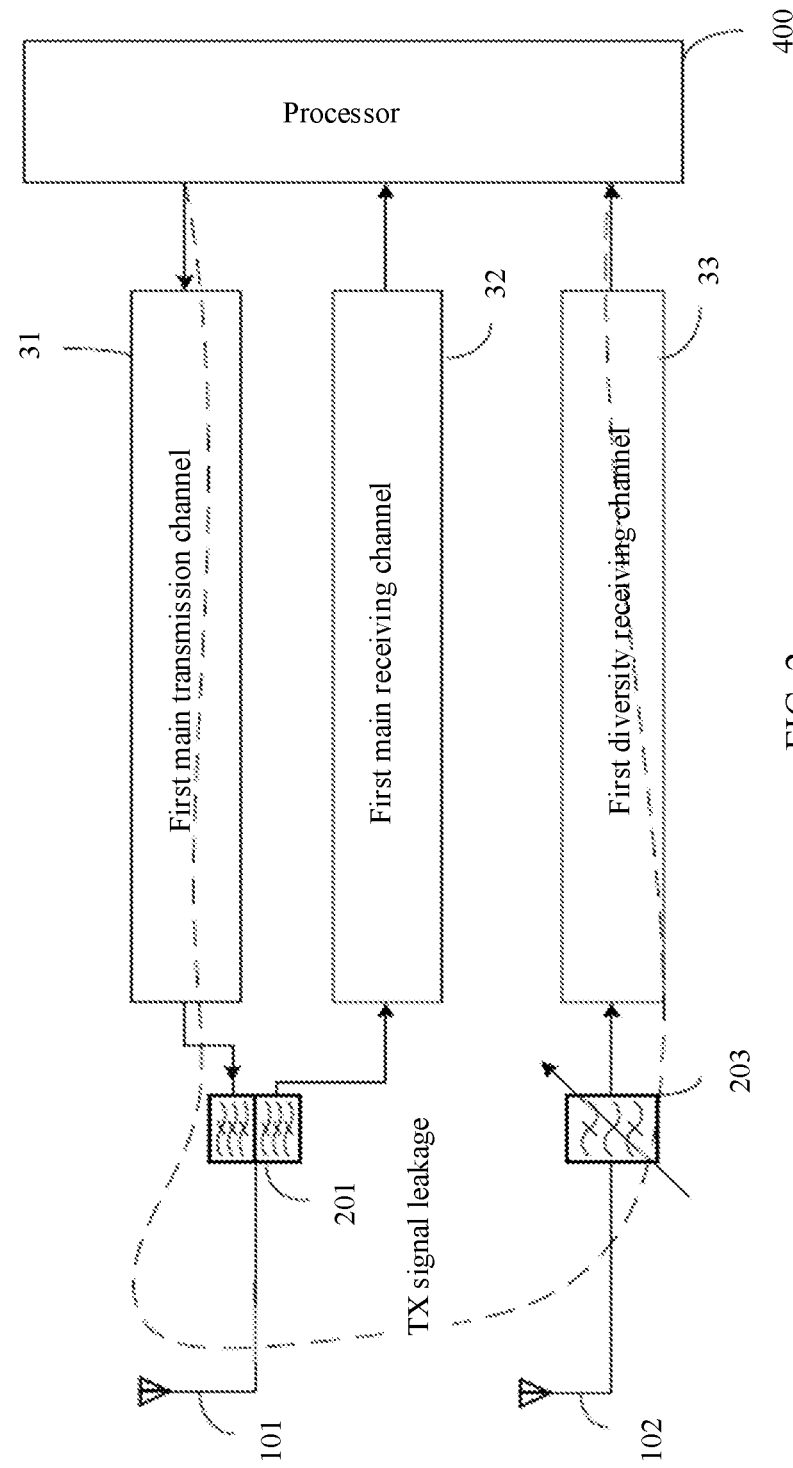
FIG. 2 is a schematic structural diagram of a diversity receiver according to an embodiment of the present application.

As shown in FIG. 2, for a problem that signal leakage occurs in an existing diversity receiver, an embodiment of the present application provides a new diversity receiver structure, so as to suppress signal leakage.

FIG. 2 shows a diversity receiver according to an embodiment of the present application. The diversity receiver may include:

a first main channel and a first diversity channel.

The first main channel may include an antenna diplexer 201, a first main transmission channel 31, and a first main receiving channel 32. The first main transmission channel 31 and the first main receiving channel 32 are separately coupled to a main antenna 101 by using the antenna diplexer 201. The first main transmission channel 31 is configured to: receive a first baseband signal generated by a processor 400, perform processing such as digital-to-analog conversion, filtering, up conversion, and power amplification on the first baseband signal to obtain a first transmit signal, transmit the first transmit signal to the main antenna 101 by using the antenna diplexer 201, and transmit the first transmit signal by using the main antenna 101. The first main receiving channel 32 is configured to: perform processing such as low-noise amplification, down conversion, filtering, and analog-to-digital conversion on a second receive signal received from the main antenna 101, to generate a third baseband signal, and send the third baseband signal to the processor 400 for baseband signal processing.

A person skilled in the art should know that, in a mobile terminal, the antenna diplexer may also be referred to as a band separator, or the like. Functions of the antenna diplexer are coupling the second receive signal with low power, feeding an amplified first transmit signal to the main antenna 101, and ensuring a high degree of isolation between the first transmit signal and the second receive signal, so that the first transmit signal and the second receive signal do not affect each other. The antenna diplexer may be considered as a special two-way three-end filter. One end of the two-way three-end filter is coupled to the main antenna 101, and the other two ends are respectively coupled to the first main transmission channel 31 and the first main receiving channel 32. For a specific connection relationship, refer to the prior art. Details are not described herein. The processor may be a baseband processor, a communication processor, a digital signal processor, an application-specific integrated circuit (ASIC), or a system on a chip (SOC). In addition, the receiving channel in this embodiment of the present application is a receiving channel on which down conversion is performed on a radio frequency signal after the radio frequency signal passes through the antenna diplexer, and the transmission channel is a transmission channel on which up conversion is performed on a radio frequency signal after the radio frequency signal passes through the antenna diplexer. Details are not described herein. For details, refer to a structure shown in FIG. 4 below and the prior art.

The first diversity channel may include a tunable bandpass filter 203 and a first diversity receiving channel 33, and the first diversity receiving channel 33 may be coupled to a diversity antenna 102 by using the tunable bandpass filter 203. The tunable bandpass filter 203 is configured to: adjust a passband bandwidth of the tunable bandpass filter 203 according to a band bandwidth of the first transmit signal processed by the first main transmission channel 31 and a band bandwidth of a first receive signal received from the diversity antenna 102, and perform bandpass filtering based on the passband bandwidth on the first receive signal, so as to suppress signal leakage caused by the first transmit signal to the first receive signal received on the first diversity receiving channel 33. The first diversity receiving channel 33 is configured to: perform processing such as low-noise amplification, down conversion, filtering, and analog-to-digital conversion on the filtered first receive signal, to generate a second baseband signal, and send the second baseband signal to the processor 400 for baseband signal processing. The second baseband signal and the third baseband signal are a pair of diversity receive signals.

It should be noted that terms such as "first", "second", "third", and the like used in this specification are merely used to distinguish between different objects, but are not intended to describe a specified sequence of the objects. For example, the first baseband signal, the second baseband signal, the third baseband signal, and the like are used to distinguish between different baseband signals, but are not intended to describe a sequence of the baseband signals.

Figure 3:
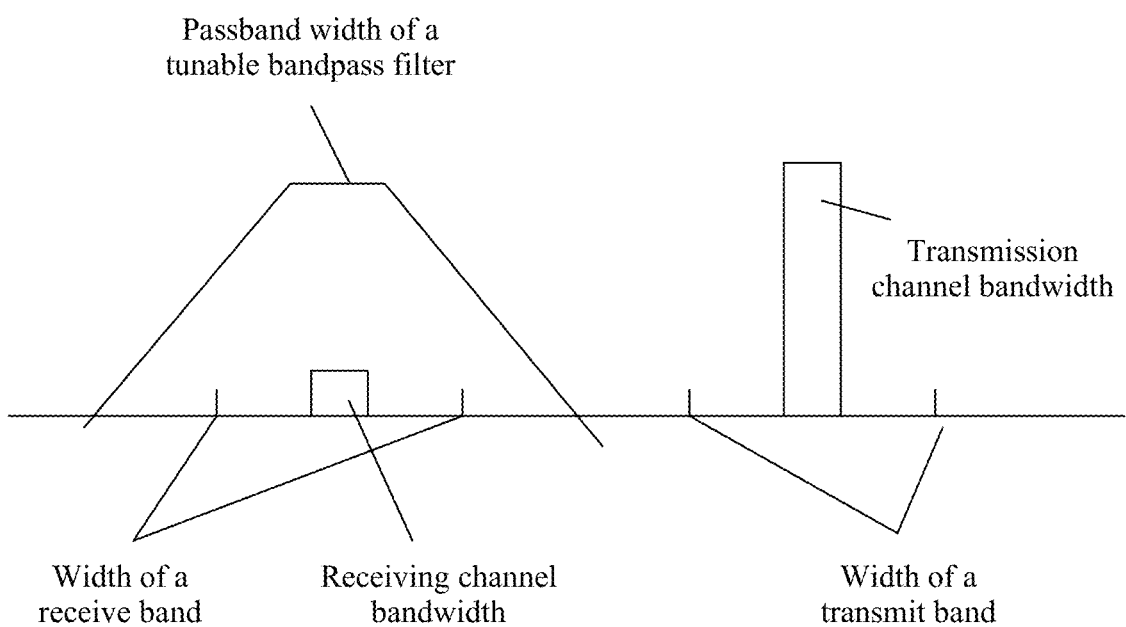
FIG. 3 is an operating principle diagram of a tunable bandpass filter according to an embodiment of the present application.

For example, for a principle of suppressing signal leakage by the tunable bandpass filter 203, refer to FIG. 3. That is, the passband bandwidth of the tunable bandpass filter 203 is adjusted, so that the band bandwidth (that is, a width of a receive band shown in FIG. 3) of the first receive signal is included in the passband bandwidth of the tunable bandpass filter 203, and the band bandwidth (that is, a width of a transmit band shown in FIG. 3) of the first transmit signal is excluded from the passband bandwidth of the tunable bandpass filter 203. It should be understood that, in a communications system, one band (band) may be usually divided into multiple channels (channel), and one frequency range may be classified as one band according to different communications protocols. In the $3^{rd}$ Generation Partnership Project (3GPP) protocol (whose version number is TS 36.101), an operating band of an evolved universal terrestrial radio access (E-UTRA) system is provided. For example, 3GPP stipulates that an uplink bandwidth of a band 1 is (1920 MHz-1980 MHz), and a downlink bandwidth of the band 1 is (2110 MHz-2170 MHz). Because of appearance of a technology such as frequency division multiplexing, one band may also be divided into multiple channels. A bandwidth of each channel may be 20 MHz, 10 MHz, or the like, and each channel may serve as a frequency resource used when a terminal transmits a wireless signal. Therefore, in FIG. 3, a receiving channel bandwidth may be understood as a width of a frequency resource on which a to-be-received wireless signal is carried, and a receive band bandwidth is a width of a band corresponding to a receiving channel. Definitions of a width of a transmit band bandwidth and a transmission channel bandwidth are similar to this, and are not described. For details, refer to the prior art.

In a conventional diversity receiver, a SAW filter is usually used to suppress transmit signal leakage. Because a frequency of the SAW filter is fixed, one SAW filter can process only a receive signal of a specified band. If a band of a receive signal changes within a relatively large range, multiple SAW filters need to be used to construct multiple diversity channels. However, according to the technical solution in this embodiment of the present application, when a transmit band of the first main channel changes within a specified range, transmit signal leakage can be suppressed by using a diversity channel including the tunable bandpass filter, thereby simplifying a structure of the diversity receiver, and helping implement miniaturization.

A person skilled in the art should know that a manner in which the processor 400 separately performs diversity receiving on the third baseband signal generated by the first main receiving channel 32 and the second baseband signal generated by the first diversity receiving channel 33 has been described in detail in the prior art. For details, refer to the prior art. Details are not described herein. In addition, because the first main receiving channel 32 and the first diversity receiving channel 33 receive radio frequency signals that carry same information, a receive band of the first main receiving channel 32 should keep the same as a receive band of the first diversity receiving channel 33.

In this embodiment of the present application, further, the first main transmission channel 31 may be a zero intermediate frequency (ZIF) transmission channel, a superheterodyne transmission channel, a low intermediate frequency (LIF) transmission channel, or the like. Correspondingly, each of the first main receiving channel 32 and the first diversity receiving channel 33 may be a zero intermediate frequency receiving channel, a low intermediate frequency receiving channel, or a superheterodyne receiving channel. The first main transmission channel 31, the first main receiving channel 32, and the first diversity receiving channel 33 may be channels of a same type. For example, the first main transmission channel 31, the first main receiving channel 32, and the first diversity receiving channel 33 all are zero intermediate frequency channels. A connection relationship between devices such as an amplifier, a filter, and a frequency mixer in each channel has been fully described in the prior art. For details, refer to the prior art.

Figure 4:
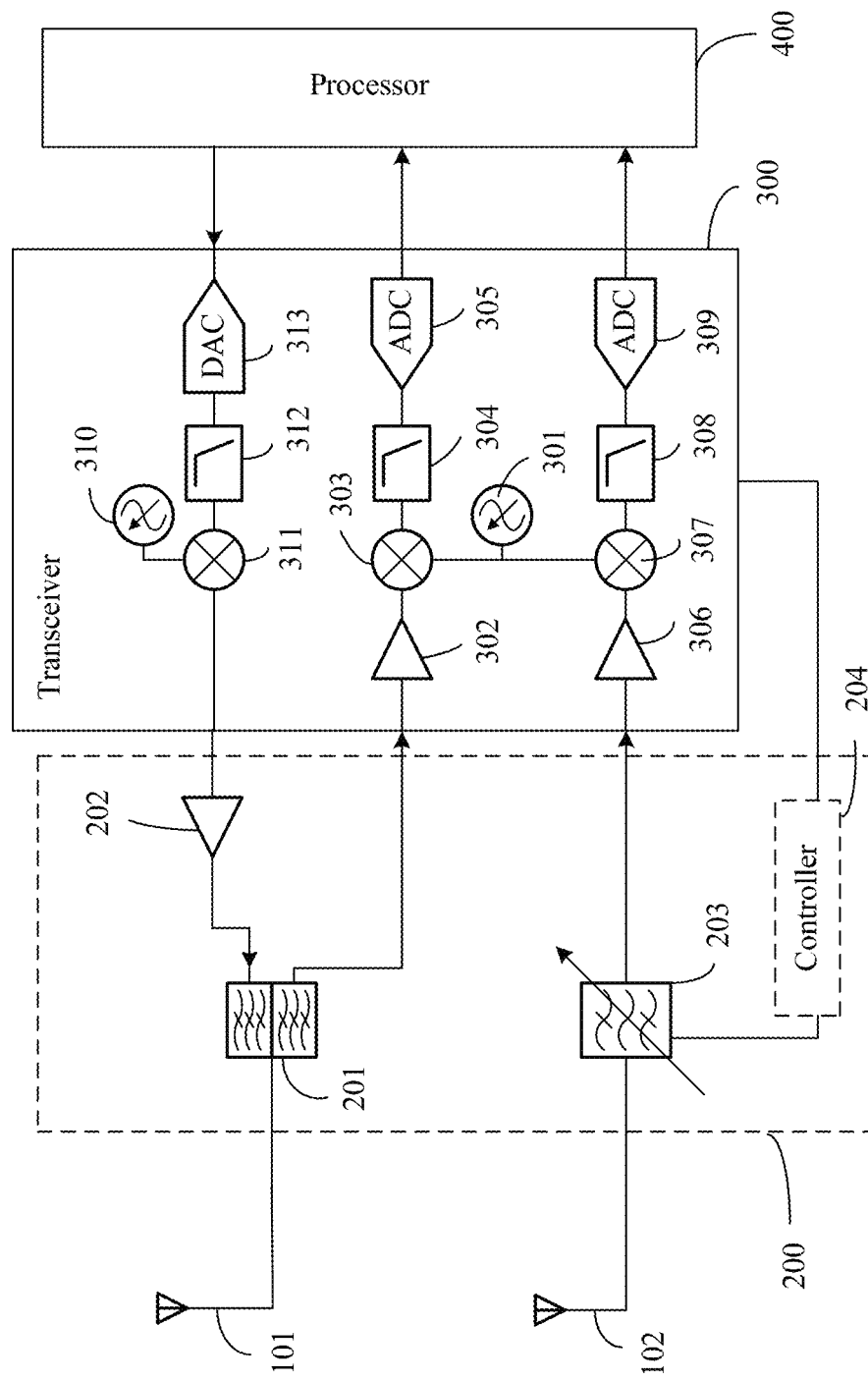
FIG. 4 is a schematic structural diagram of another diversity receiver according to an embodiment of the present application.

As shown in FIG. 4, structures of the first main transmission channel 31, the first main receiving channel 32, and the first diversity receiving channel 33 are separately described in detail by using a zero intermediate frequency channel as an example. In FIG. 4, the first main transmission channel 31 may specifically include a power amplifier 202, a first frequency mixer 311, a first oscillator 310, a first low-pass filter 312, and a digital-to-analog converter 313. The first main transmission channel 31 is coupled to the antenna diplexer 201 by using the power amplifier 202. An operating principle of the first main transmission channel 31 is as follows: The digital-to-analog converter 313 first performs digital-to-analog conversion on the first baseband signal generated by the processor 400, the first low-pass filter 312 performs filtering on a converted analog signal, the first frequency mixer 311 performs frequency mixing on a filtered signal and a local-frequency signal generated by the first oscillator 310, and then the power amplifier 202 performs power amplification on a signal obtained after the frequency mixing, so as to obtain the first transmit signal. A circuit formed by the power amplifier 202, the first frequency mixer 311, the first oscillator 310, the first low-pass filter 312, and the digital-to-analog converter 313 is usually referred to as an up-conversion circuit. The first main receiving channel 32 may specifically include a first low-noise amplifier (LNA) 302, a second frequency mixer 303, a second low-pass filter 304, a first analog-to-digital converter 305, and a second oscillator 301. The first main receiving channel 32 is coupled to the antenna diplexer 201 by using the first low-noise amplifier 302. An operating principle of the first main receiving channel 32 is as follows: The first low-noise amplifier 302 first performs amplification on the second receive signal obtained by using the antenna diplexer 201, then the second frequency mixer 303 performs frequency mixing on an amplified signal and a local-frequency signal generated by the second oscillator 301, to obtain a baseband signal, and the second low-pass filter 304 and the first analog-to-digital converter 305 separately perform low-pass filtering and analog-to-digital conversion on the baseband signal to obtain the third baseband signal, and send the third baseband signal to the processor 400 for diversity receiving. A circuit formed by the first low-noise amplifier 302, the second frequency mixer 303, the second low-pass filter 304, the first analog-to-digital converter 305, and the second oscillator 301 is usually referred to as a down-conversion circuit. The first diversity receiving channel 33 may include a second low-noise amplifier 306, a third frequency mixer 307, a third low-pass filter 308, a second analog-to-digital converter 309, and the second oscillator 301. The second low-noise amplifier 306 in the first diversity receiving channel 33 is coupled to the diversity antenna 102 by using the tunable bandpass filter 203. An operating principle of the first diversity receiving channel 33 is similar to that of the first main receiving channel 32. Details are not described herein again. It should be noted that because both the first diversity receiving channel 33 and the first main receiving channel 32 need to perform down conversion on radio frequency signals of a same frequency, the first diversity receiving channel 33 and the first main receiving channel 32 may multiplex the same oscillator 301. Certainly, the first diversity receiving channel 33 and the first main receiving channel 32 may use separate oscillators to generate respectively-required local-frequency signals. This is not limited herein.

Further, in a chip design scheme of a wireless terminal, as shown in FIG. 4, the antenna diplexer 201, the power amplifier 202, the tunable bandpass filter 203, and the like are usually encapsulated as a radio frequency front-end circuit 200. The first frequency mixer 311, the first oscillator 310, the first low-pass filter 312, the digital-to-analog converter 313, the first low-noise amplifier 302, the second frequency mixer 303, the second low-pass filter 304, the first analog-to-digital converter 305, the second low-noise amplifier 306, the third frequency mixer 307, the third low-pass filter 308, the second analog-to-digital converter 309, the second oscillator 301, and the like are encapsulated as another integrated circuit (IC) that is referred to as a transceiver 300 or a radio frequency integrated circuit (RF IC). For ease of representation, the transceiver is merely used to replace a conversion circuit part in a main channel and a diversity channel below, that is, the transceiver is used to represent an up-conversion circuit and a down-conversion circuit.

In this embodiment of the present application, further, the diversity receiver may further include a controller 204. The controller 204 is specifically configured to control, according to the band bandwidth of the first transmit signal processed by the first main transmission channel 31 and a band bandwidth of the second receive signal received on the first diversity receiving channel 33, the tunable bandpass filter 203 to adjust the passband bandwidth of the tunable bandpass filter 203, so as to filter out a part of signal leaked from the first transmit signal to the first diversity receiving channel 33.

Further, the controller 204 may be encapsulated into the radio frequency front-end circuit 200, so as to improve an integration degree of the diversity receiver, and reduce an area of a printed circuit board (PCB). It should be understood that the controller 204 may be implemented by using various logic circuits. For details, refer to the prior art.

A person skilled in the art should know that, with continuous improvement of a chip manufacturing technology, the radio frequency front-end circuit 200 and the transceiver 300 may be encapsulated into one IC in the future. Therefore, according to the current chip design scheme of the wireless terminal in the present application, that the diversity receiver is divided into two separate chips: the radio frequency front-end circuit 200 and the transceiver 300 in this embodiment of the present application should not construct a limitation on the present application.

In this embodiment of the present application, further, as shown in FIG. 3, the tunable bandpass filter 203 may be further configured to adjust the passband bandwidth of the tunable bandpass filter 203 to a channel bandwidth of the first receive signal, so as to enhance a capability of suppressing leakage of the first transmit signal. It should be understood that, in a communications system, one band may be generally divided into multiple channels (channel). For example, a 2.4-GHz band may be divided into 13 channels, and a bandwidth of each channel is 22 MHz. Therefore, the tunable bandpass filter 203 uses the channel bandwidth of the first receive signal as the passband bandwidth, so that a channel of the first transmit signal is further far from a passband of the tunable bandpass filter 203. This improves a capability of suppressing leakage of the first transmit signal.

Figure 5:
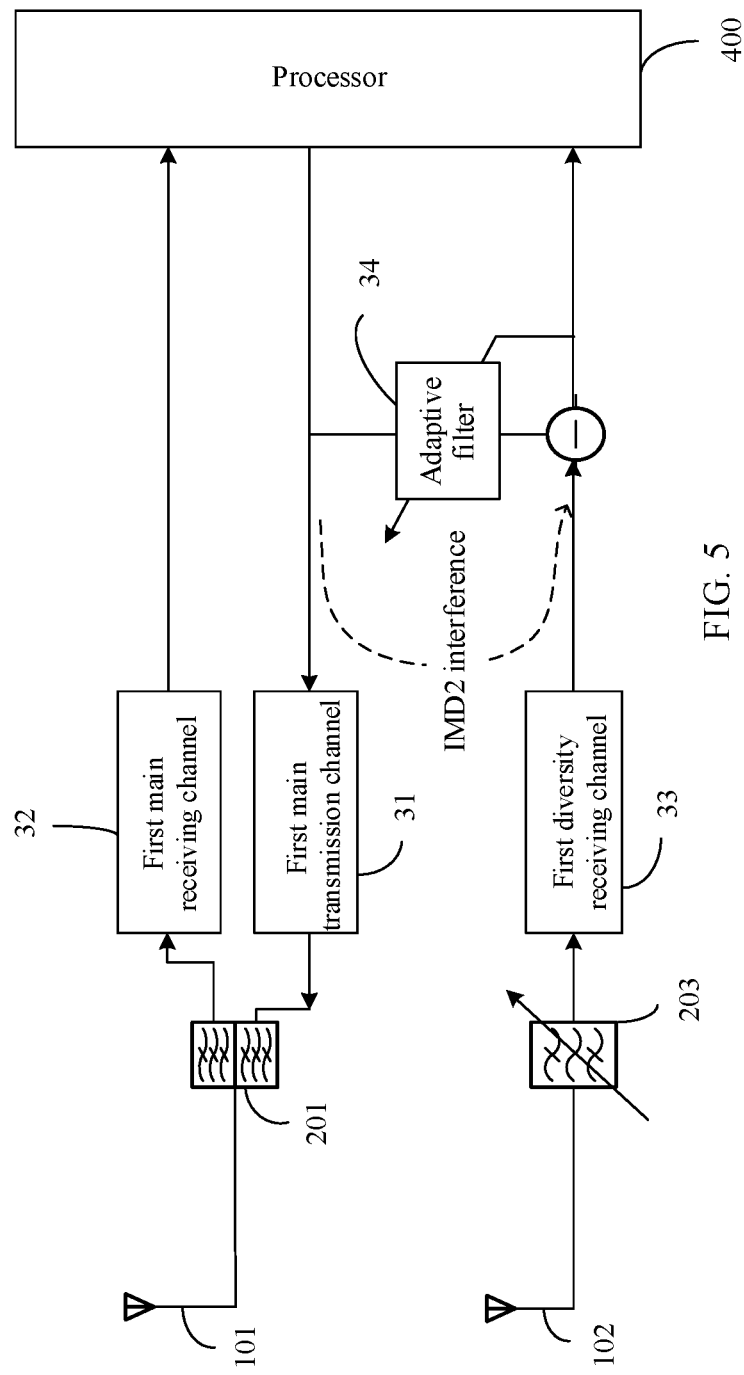
FIG. 5 is a schematic structural diagram of still another diversity receiver according to an embodiment of the present application.

In this embodiment of the present application, further, as shown in FIG. 5, the diversity receiver further includes an adaptive filter 34. The adaptive filter 34 is separately coupled to the first main transmission channel 31 and the first diversity receiving channel 33. Specifically, one end of the first main transmission channel 31 is coupled to the antenna diplexer 201, one end of the adaptive filter 34 is coupled to the other end of the first main transmission channel 31 and the processor 400, one end of the first diversity receiving channel 33 is coupled to the tunable bandpass filter 203, and the other end of the adaptive filter 34 is coupled to the other end of the first diversity receiving channel 33 and the processor 400. The adaptive filter 34 is configured to: construct, based on an adaptive filtering algorithm and by using the first baseband signal obtained on the first main transmission channel 31, an IMD2 interference signal generated because of signal leakage of the first baseband signal to the first diversity receiving channel 33, and filter out, in a digital domain, the IMD2 interference signal from the second baseband signal generated by the first diversity receiving channel 33. The adaptive filtering algorithm may include at least one of a least mean square (LMS) algorithm, a recursive least square (RLS) algorithm, or another similar algorithm. For details, refer to the prior art. Details are not described herein.

Specifically, an operating principle of the adaptive filter 34 may be briefly described as follows:

IMD2 interference is caused by leakage of the first transmit signal on the first main transmission channel 31. Therefore, the adaptive filter 34 may construct the IMD2 interference signal according to the first baseband signal on the first main transmission channel 31.

Because IMD2 interference is caused after the first baseband signal passes through a loop that includes the first main transmission channel 31, the power amplifier 202, the main antenna 101, the diversity antenna 102, and the first diversity receiving channel 33, the first baseband signal may be used as a reference signal. Considering that a current receiver is mainly based on an in-phase/quadrature (I/Q) modulation technology, TX_Ref_I represents an in-phase component of the reference signal, and TX_Ref_Q represents a quadrature component of the reference signal herein. There is a specified delay between the reference signal and the IMD2 interference signal obtained after the first baseband signal passes through the loop to enter the first diversity receiving channel 33. Therefore, the reference signal needs to be first synchronized to compensate for a loop delay, so that the reference signal obtained after the synchronization aligns with the IMD2 interference signal. That is, because the reference signal is prior to the IMD2 interference signal, the reference signal needs to be delayed, so that the reference signal and the IMD2 interference signal are synchronized. Because the IMD2 interference signal is included in the second baseband signal generated by the first diversity receiving channel 33, the second baseband signal is used to synchronize with the reference signal herein. For ease of description, herein, RX_I represents an in-phase component of the second baseband signal, RX_Q represents a quadrature component of the second baseband signal, $I_t$ represents an i-order in-phase component of the reference signal obtained after the synchronization, $Q_i$ represents an i-order quadrature component of the reference signal obtained after the synchronization, $I_j$ represents a j-order in-phase component of the reference signal obtained after the synchronization, and $Q_j$ represents a j-order quadrature component of the reference signal obtained after the synchronization, where i and j are natural numbers, i≤n, j≤n, and i≠j.

Signal leakage from the first main transmission channel 31 to the first diversity receiving channel 33 has a memory effect. Therefore, an IMD2 term having an n-order memory effect may be first generated according to the reference signal obtained after the synchronization. It should be noted that an expansion of the IMD2 interference signal may be considered as a polynomial, and the IMD2 term is a term of this polynomial. That is, the IMD2 term includes vectors such as $(I_i^2+Q_i^2)$, $(I_i I_j+Q_i Q_j)$, and $(I_i I_j-Q_i Q_j)$.

Next, the IMD2 interference signal is constructed by using the IMD2 term and based on the following formula (1):

$$IMD2 = \sum_{i=1}^{n} S_i(I_i^2 + Q_i^2) + \sum_{i=1,j=1}^{n} C_{ij}(I_i I_j + Q_i Q_j) + \sum_{i=1,j=1}^{n} nC_{ij}(I_i I_j - Q_i Q_j) + DC. \quad (1)$$

$S_i$ is an autocorrelation coefficient, $C_{ij}$ is a cross coefficient, $nC_{ij}$ is a negative cross coefficient, DC represents a direct current term, and a value of DC may be set to a fixed value.

Finally, the constructed IMD2 interference signal is subtracted from the second baseband signal to obtain a second baseband signal obtained after IMD2 interference is canceled, and the second baseband signal obtained after IMD2 interference is canceled is sent to the processor 400. Herein, RX_I_output represents an in-phase component of the second baseband signal obtained after IMD2 interference is canceled, and RX_Q_output represents a quadrature component of the second baseband signal obtained after IMD2 interference is canceled.

Figure 6:
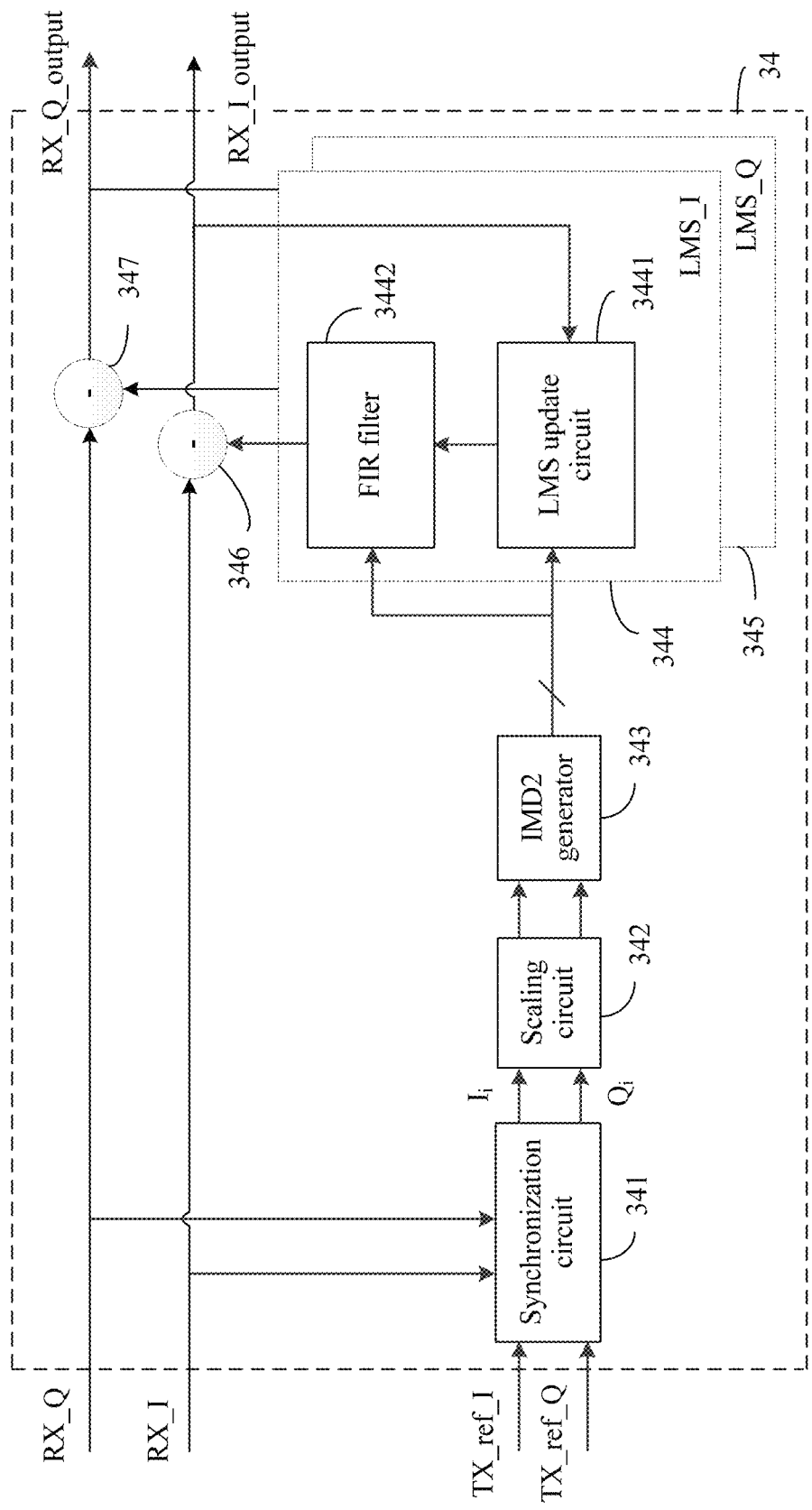
FIG. 6 is a schematic structural diagram of an adaptive filter according to an embodiment of the present application.

To better describe a principle of the adaptive filter 34, the LMS algorithm is used as an example herein. With reference to FIG. 6, a structure of the adaptive filter 34 is briefly described. As shown in FIG. 6, the adaptive filter 34 may include a synchronization circuit 341, a zoom circuit 342, an IMD2 generator 343, an in-phase signal construction circuit 344, a quadrature signal construction circuit 345, a subtractor 346, and a subtractor 347.

The synchronization circuit 341 is configured to separately perform synchronization on TX_Ref_I and TX_Ref_Q based on RX_I and RX_Q, to obtain reference signals $I_i$ and $Q_i$ obtained after the synchronization.

The scaling circuit 342 is configured to perform scaling processing on $I_i$ and $Q_i$ according to a preset proportionality coefficient.

The IMD2 generator 343 is configured to generate an IMD2 term according to $I_i$ and $Q_i$ obtained after the scaling.

The IMD2 interference signal is constructed separately according to an in-phase path and a quadrature path. For ease of description, the in-phase signal construction circuit 344 (represented by LMS_I in FIG. 5) is used as an example for description herein. A structure of the quadrature signal construction circuit 345 (represented by LMS_Q in FIG. 5) is the same as that of the in-phase signal construction circuit.

Mutual reference may be made to each other. The in-phase signal construction circuit 344 includes an LMS update circuit 3441 and a finite impulse response (FIR) filter 3442. The LMS update circuit 3441 is configured to update an IMD2 coefficient according to a residual error in RX_I_output and the IMD2 term generated by the IMD2 generator 343. The IMD2 coefficient includes an autocorrelation coefficient $S_i$, a cross coefficient $C_{ij}$, and a negative cross coefficient $nC_{ij}$. The finite impulse response filter 3442 is configured to construct an IMD2 interference signal according to the IMD2 coefficient provided by the LMS update circuit 3441 and the IMD2 term generated by the IMD2 generator 343. For a specific construction manner, refer to the foregoing formula (1).

The subtractor 346 is configured to subtract the IMD2 interference signal constructed by the in-phase signal construction circuit 344 from an in-phase component RX_I of a third baseband signal, to obtain an in-phase component RX_I_output of a third baseband signal obtained after IMD2 interference is canceled.

The subtractor 347 is configured to subtract the IMD2 interference signal constructed by the quadrature signal construction circuit 345 from a quadrature component RX_Q of the third baseband signal, to obtain a quadrature component RX_Q_output of the third baseband signal obtained after IMD2 interference is canceled.

Compared with the SAW filter with a fixed frequency, an outband suppression degree of the tunable bandpass filter 203 is usually lower than that of the SAW filter. Therefore, a degree of suppressing leakage of a TX signal is relatively low. For a currently mainstream zero intermediate frequency receiver, an IMD2 interference signal is generated when a leaked signal enters the first diversity receiving channel, and performance of the diversity receiver is affected when the IMD2 interference signal overlaps the second baseband signal. Therefore, according to the adaptive filter 34 provided in this embodiment of the present application, the first diversity receiving channel 33 can output the second baseband signal that does not include IMD2 interference, and then the processor 400 performs corresponding processing. This further improves interference suppression performance of the diversity receiver.

A person skilled in the art should know that FIG. 6 merely shows an example of the structure of the adaptive filter 34. A person skilled in the art may implement functions of the adaptive filter 34 by using different digital circuits and based on the concept of this embodiment of the present application and an adaptive filtering algorithm other than the LMS algorithm. Therefore, the specific circuit structure shown in FIG. 6 should not construct a limitation on the adaptive filter 34 provided in the present application.

Figure 7:
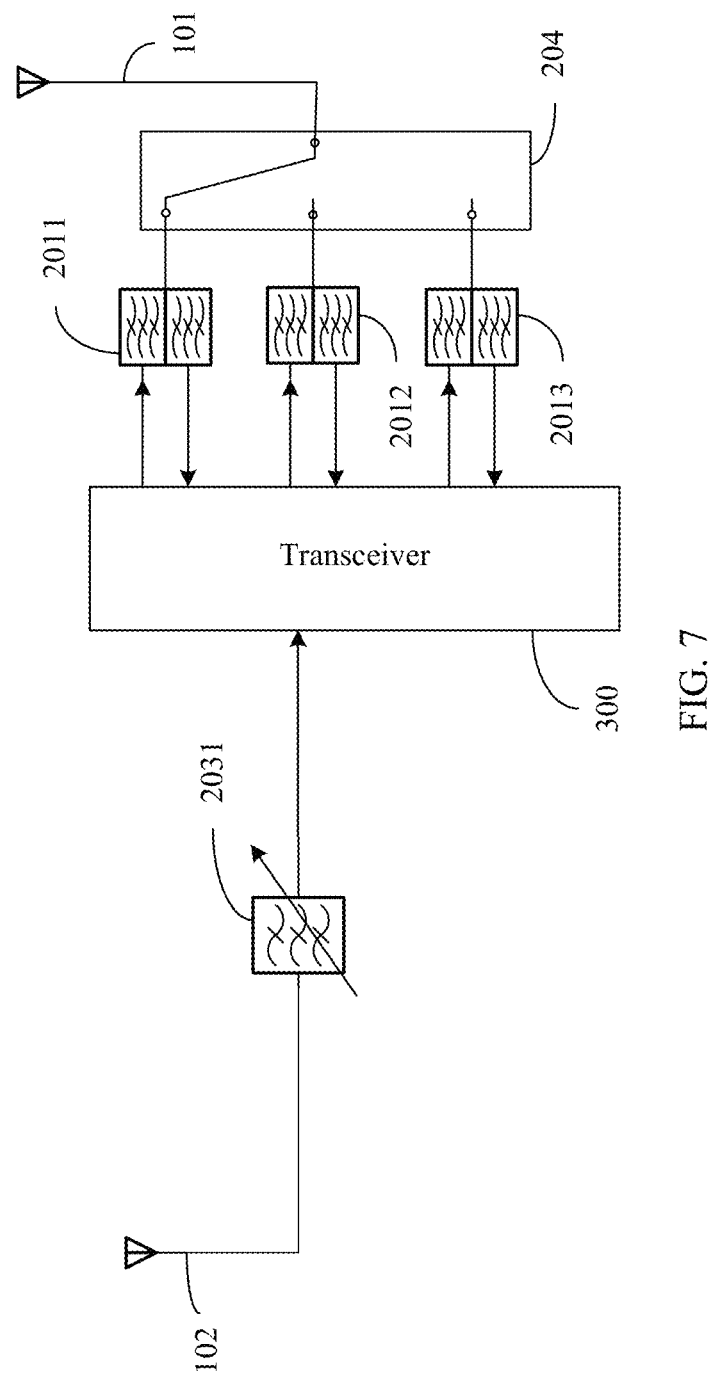
FIG. 7 is a schematic structural diagram of still another diversity receiver according to an embodiment of the present application.

Further, in this embodiment of the present application, as shown in FIG. 7, the diversity receiver may include multiple main channels (the multiple main channels are separately identified by 2011, 2012, and 2013 herein) and a main switch 204. It should be noted that, for ease of representation, a main receiving channel and a main transmission channel of each main channel are integrated into the transceiver in FIG. 7. Therefore, only the antenna diplexer is used to represent each main channel herein. The main switch 204 is configured to: select one currently-working main channel from the multiple main channels as the first main channel, and conduct the first main channel and the main antenna 101. A person skilled in the art should know that different hardware parameters are set for the main channels, so that the multiple main channels can be separately corresponding to different operating bands. An operating band of each main channel includes a transmit band of a main transmission channel and a receive band of a main receiving channel. For ease of description, the following provides description separately by using a transmit band of the main channel and a receive band of the main channel as examples. This is not described below. In this way, the diversity receiver can support multiband signal receiving or multiband signal sending.

Figure 8:
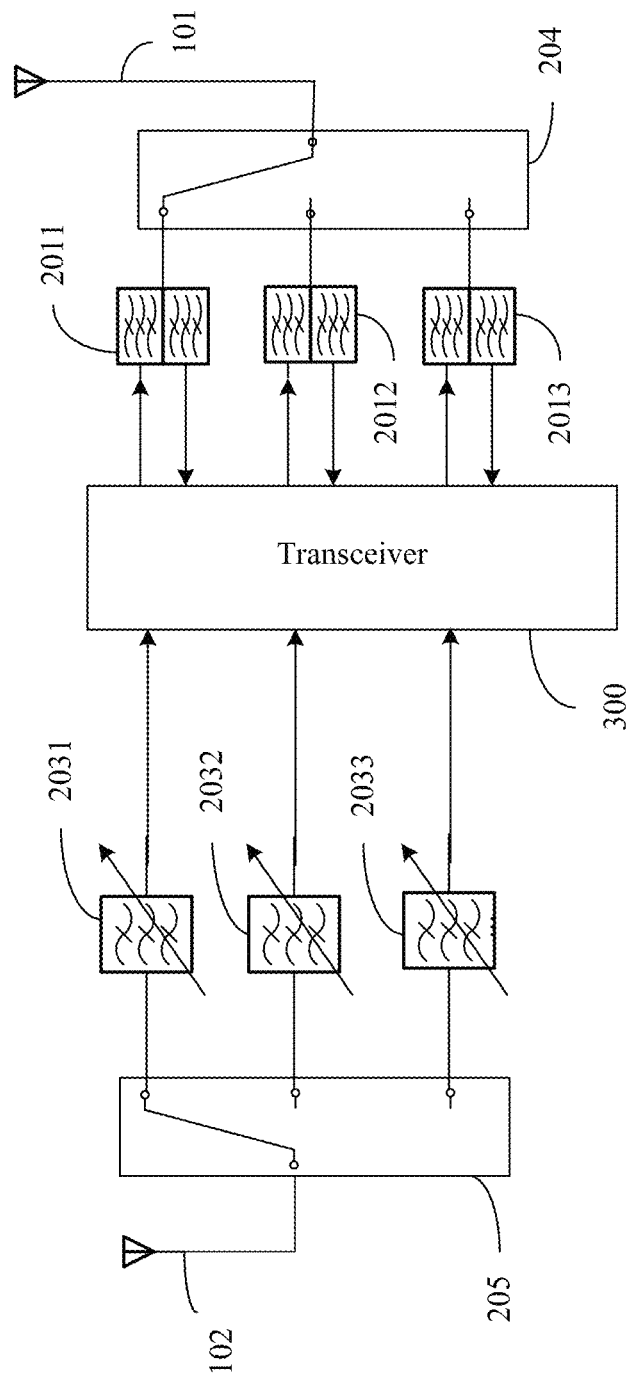
FIG. 8 is a schematic structural diagram of still another diversity receiver according to an embodiment of the present application.

Further, as shown in FIG. 8, the diversity receiver may include multiple diversity channels (the multiple diversity channels are separately identified by 2031, 2032, and 2033 herein) and a diversity switch 205. Herein, filtering ranges of respective tunable bandpass filters of the multiple diversity channels may be different. It should be understood that, for ease of representation, a diversity receiving channel of each diversity channel is also integrated into the transceiver 300 in FIG. 8. Therefore, only the tunable bandpass filter is used to represent each diversity channel herein. The diversity switch 205 is configured to: select, from the multiple diversity channels according to the currently-working first main channel determined by the main switch 204, one diversity channel matching the first main channel to serve as the first diversity channel, and conduct the first diversity channel and the diversity antenna 102. Because a receive band of the first diversity channel should keep the same as a receive band of the first main channel, a filtering range of a tunable bandpass filter in the diversity channel selected by the diversity switch 205 does not overlap the transmit band of the first main channel, and the filtering range of the tunable bandpass filter in the selected diversity channel matches the receive band of the first main channel, so as to filter out a signal leaked from the first main channel to the first diversity channel.

It should be understood that, in current various communications systems such as a Long Term Evolution (LTE) system, a Universal Mobile Telecommunications System (UMTS), and Narrowband Internet of Things, different communication bands are separately used and may be roughly classified into a low band (LB) (including bands such as B5, B8, B17, and B28) that covers 700-900 MHz, a high band (HB) (including bands such as B1, B2, B3, and B4) that covers 1700-2100 MHz, and an ultrahigh band (UHB) (including bands such as B7, B38, and B41) that covers 2300-2700 MHz. To meet a requirement for multiband receiving, a device (for example, an antenna diplexer or an oscillator) parameter of each main channel may be set, so that the multiple main channels are separately corresponding to different bands. For example, a receive band of a main channel 2011 may be corresponding to a band B3, a receive band of a main channel 2012 may be corresponding to a band B5, and a receive band of a main channel 2013 may be corresponding to a band B38. If a signal that currently needs to be received is corresponding to the band B5, the main switch 204 selects the main channel 2012 as a currently-working main channel, that is, the first main channel, and conducts the main channel 2012 and the main antenna 101. In addition, a filtering band of the tunable bandpass filter usually has a specified range. For example, a filtering range of a tunable bandpass filter in a diversity channel 2031 may be corresponding to an LB, a filtering range of a tunable bandpass filter in a diversity channel 2032 may be corresponding to an HB, and a filtering range of a tunable bandpass filter in a diversity channel 2033 may be corresponding to a UHB. After the main channel 2012 is determined as the currently-working first main channel, to ensure filtering performance, the diversity switch 205 may select the diversity channel 2031 as the first diversity channel corresponding to the first main channel, and conduct the diversity channel 2031 and the diversity antenna 102, so that the filtering range of the tunable bandpass filter in the diversity channel 2031 can match the band B5 corresponding to the currently-working main channel 2012. That is, the band B5 falls within a normal operating range of the tunable bandpass filter in the diversity channel 2031. Certainly, if an operating band corresponding to the main channel 2012 is a band such as B8, B17, or B28, because the filtering range of the tunable bandpass filter in the diversity channel 2031 may cover an LB, the diversity channel 2031 may be still used as the first diversity channel matching the main channel 2012.

It can be learned that, according to the solution provided in this embodiment of the present application, a chip area can be effectively reduced, and this is conducive to miniaturized integration of the diversity receiver. However, if a SAW filter is used as a multiband receiver as described in the prior art, to ensure filtering performance, even for each of the bands such as B5, B8, B17, and B28 that all belong to the LB, the diversity channel requires a SAW filter for filtering. Consequently, a receiver structure is extremely complex, and a quantity of SAW filters is large, so that an area of the radio frequency front-end circuit significantly increases, and a requirement of a mobile terminal for a miniaturized and low-cost radio frequency subsystem cannot be met.

Figure 9:
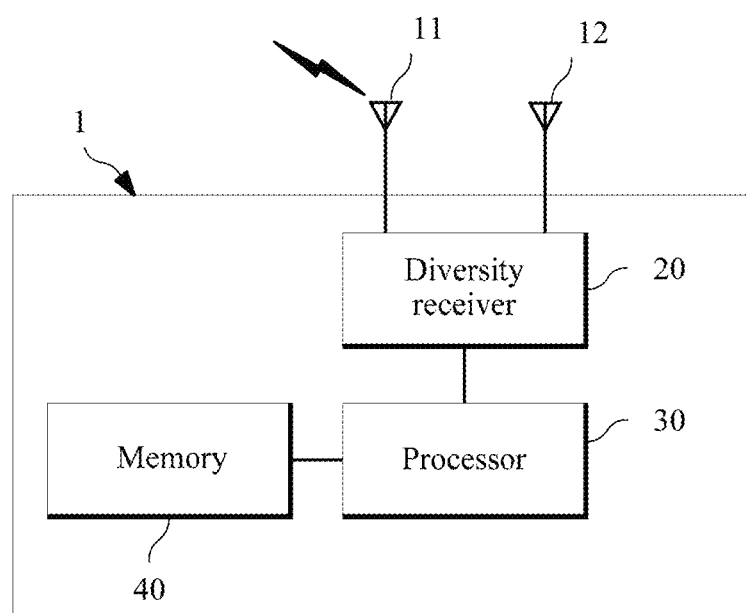
FIG. 9 a schematic structural diagram of a terminal according to an embodiment of the present application.

As shown in FIG. 9, an embodiment of the present application further provides a terminal 1. The terminal 1 includes a diversity receiver 20 and a processor 30 coupled to the diversity receiver 20. For a structure of the diversity receiver 20, refer to the diversity receiver described in the foregoing implementation, and for details, refer to the diversity receiver shown in FIG. 2 to FIG. 8. For the processor 30, refer to the processor 400 described in the foregoing implementation. It should be noted that the terminal provided in this embodiment of the present application may be a mobile terminal including a smartphone, a personal digital assistant (PDA), a tablet computer, a handheld terminal, and a wearable device, or may be an intelligent robot or an in-vehicle device with a communication capability.

Further, the terminal 1 further includes a main antenna 11 and a diversity antenna 12, and the diversity receiver 20 is separately coupled to the main antenna 11 and the diversity antenna 12.

The diversity receiver 20 may be configured to: receive a first receive signal from the diversity antenna 12, receive a second receive signal from the main antenna 11, separately perform down conversion processing on the first receive signal and the second receive signal, and generate a second baseband signal and a third baseband signal. The processor 30 is configured to perform corresponding diversity receiving on the second baseband signal and the third baseband signal by using a diversity receiving technology.

In addition, the processor 30 is further configured to generate a to-be-sent first baseband signal. Correspondingly, the diversity receiver 20 is further configured to: perform up conversion on the first baseband signal to obtain a first transmit signal, and transmit the first transmit signal by using the main antenna 11.

The diversity receiver 20 is further configured to: adjust, according to a band bandwidth of the first transmit signal and a band bandwidth of the first receive signal, a passband bandwidth of a tunable bandpass filter in a diversity receiving channel on which the first receive signal is located, and perform filtering on the first receive signal, so as to suppress signal leakage caused by the first transmit signal to the first receive signal.

Further, the terminal 1 may further include a memory 40 coupled to the processor 30. The memory 40 is configured to store various algorithms and instructions required when the processor 30 generates the first baseband signal and performs diversity receiving on the second baseband signal and the third baseband signal. For details, refer to the prior art. Details are not described herein.

It should be understood that specific embodiments described herein are merely common embodiments of the present application, but are not intended to limit the present application. Any modification, equivalent replacement, and improvement made without departing from the principle of the present application shall fall within the protection scope of the present application.

What is claimed is:

1. A diversity receiver, comprising:
a first main channel comprising:
an antenna diplexer, and
a first main transmission channel coupled to a main antenna by using the antenna diplexer and configured to: generate a first transmit signal according to a first baseband signal, and send the first transmit signal to the main antenna by using the antenna diplexer; and
a first diversity channel comprising,
a tunable bandpass filter, and
a first diversity receiving channel coupled to a diversity antenna by using the tunable bandpass filter and configured to: perform bandpass filtering on a first receive signal based on a tunable passband, and generate a second baseband signal according to the filtered first receive signal,
wherein the first main channel further comprises:
a first main receiving channel configured to generate a third baseband signal according to a second receive signal received from the main antenna, wherein the third baseband signal and the second baseband signal are a pair of diversity receive signals.

2. The diversity receiver according to claim 1, wherein the tunable bandpass filter is configured to adjust the passband of the tunable bandpass filter according to a band of the first transmit signal and a band of a first receive signal received from the diversity antenna.

3. The diversity receiver according to claim 1, wherein the tunable bandpass filter is configured to set the passband of the tunable bandpass filter as a channel of the first receive signal.

4. The diversity receiver according to claim 1, wherein each of the first main transmission channel, the first main receiving channel, and the first diversity receiving channel comprises a one of a zero intermediate frequency channel, a low intermediate frequency channel, or a superheterodyne channel.

5. The diversity receiver according to claim 1, wherein the diversity receiver further comprises:
an adaptive filter separately coupled to the first main transmission channel and the first diversity receiving channel and configured to:
construct, by using the first baseband signal received on the first main transmission channel and by performing an adaptive filtering algorithm, a second-order intermodulation distortion (IMD2) interference signal generated because of signal leakage of the first baseband signal to the first diversity receiving channel; and
filter out the IMD2 interference signal from the second baseband signal generated by the first diversity receiving channel.

6. The diversity receiver according to claim 5, wherein the adaptive filtering algorithm comprises at least one of a least mean square (LMS) algorithm or a recursive least square (RLS) algorithm.

7. The diversity receiver according to claim 5, wherein the adaptive filter is configured to:
use the first baseband signal as a reference signal, synchronize the reference signal with the second baseband signal, and construct the IMD2 interference signal according to the following formula:

$$IMD2 = \sum_{i=1}^{n} S_i(I_i^2 + Q_i^2) + \sum_{i=1,j=1}^{n} C_{ij}(I_iI_j + Q_iQ_j) + \sum_{i=1,j=1}^{n} nC_{ij}(I_iI_j - Q_iQ_j) + DC,$$

wherein
IMD2 represents the constructed IMD2 interference signal, $I_i$ represents an i-order in-phase component of the reference signal obtained after the synchronization, $Q_i$ represents an i-order quadrature component of the reference signal obtained after the synchronization, $I_j$ represents a j-order in-phase component of the reference signal obtained after the synchronization, $Q_j$ represents a j-order quadrature component of the reference signal obtained after the synchronization, $S_i$ is an autocorrelation coefficient, $C_{ij}$ is a cross coefficient, $nC_{ij}$ is a negative cross coefficient, and DC represents a direct current term, wherein i and j are natural numbers, i≤n, j≤n, and i≠j.

8. The diversity receiver according to claim 1, comprising:
multiple main channels; and
a main switch configured to select one of the multiple main channels as the first main channel.

9. The diversity receiver according to claim 8, comprising:
multiple diversity channels; and
a diversity switch configured to select, from the multiple diversity channels according to the first main channel determined by the main switch, one diversity channel matching the first main channel to serve as the first diversity channel, wherein a filtering range of a tunable bandpass filter in the diversity channel selected by the diversity switch does not overlap a transmit band of the first main channel, but matches a receive band of the first main channel.

10. A terminal, comprising:
a diversity receiver, comprising:
a first main channel comprising:
an antenna diplexer;
a first main transmission channel coupled to a main antenna by using the antenna diplexer and configured to: generate a first transmit signal according to a first baseband signal, and send the first transmit signal to the main antenna by using the antenna diplexer; and
a first main receiving channel configured to generate a third baseband signal according to a second receive signal received from the main antenna; and
a first diversity channel comprising:
a tunable bandpass filter; and
a first diversity receiving channel coupled to a diversity antenna by using the tunable bandpass filter and configured to: perform bandpass filtering on a first receive signal based on a tunable passband, and generate a second baseband signal according to the filtered first receive signal, wherein the third baseband signal and the second baseband signal are a pair of diversity receive signals; and a processor coupled to the diversity receiver and configured to:

generate the first baseband signal, and perform diversity receiving on the second baseband signal and the third baseband signal generated by the diversity receiver.

11. The terminal according to claim 10, wherein the tunable bandpass filter is configured to adjust the passband of the tunable bandpass filter according to a band of the first transmit signal and a band of a first receive signal received from the diversity antenna.

12. The terminal according to claim 10, further comprising:

the main antenna and the diversity antenna, wherein the main antenna and the diversity antenna are separately coupled to the diversity receiver.

13. An integrated circuit, comprising:

a first main transmission channel coupled to an antenna diplexer and configured to: generate a first transmit signal according to a first baseband signal, and send the first transmit signal to a main antenna by using the antenna diplexer;

a first main receiving channel configured to generate a second baseband signal according to a first receive signal received from the main antenna; and a first diversity receiving channel coupled to a tunable bandpass filter and configured to: receive a second signal filtered by the tunable bandpass filter from a diversity antenna, and generate a third baseband signal according to the filtered second receive signal, wherein the second baseband signal and the third baseband signal are a pair of diversity receive signals.

14. The integrated circuit according to claim 13, wherein each of the first main transmission channel, the first main receiving channel, and the first diversity receiving channel comprises a one of a zero intermediate frequency channel, a low intermediate frequency channel, or a superheterodyne channel.

15. The integrated circuit according to claim 13, wherein the integrated circuit further comprises:

an adaptive filter separately coupled to the first main transmission channel and the first diversity receiving channel and configured to:

construct, by using the first baseband signal received on the first main transmission channel and by performing an adaptive filtering algorithm, a second-order intermodulation distortion (IMD2) interference signal generated because of signal leakage of the first baseband signal to the first diversity receiving channel; and filter out the IMD2 interference signal from the third baseband signal generated by the first diversity receiving channel.

16. The integrated circuit according to claim 15, wherein the adaptive filtering algorithm comprises at least one of a least mean square (LMS) algorithm or a recursive least square (RLS) algorithm.

17. The integrated circuit according to claim 15, wherein the adaptive filter is configured to:

use the first baseband signal as a reference signal, synchronize the reference signal with the second baseband signal, and construct the IMD2 interference signal according to the following formula:

$$IMD2 = \sum_{i=1}^{n} S_i(I_i^2 + Q_i^2) + \sum_{i=1,j=1}^{n} C_{ij}(I_iI_j + Q_iQ_j) + \sum_{i=1,j=1}^{n} nC_{ij}(I_iI_j - Q_iQ_j) + DC,$$

wherein

IMD2 represents the constructed IMD2 interference signal, $I_i$ represents an i-order in-phase component of the reference signal obtained after the synchronization, $Q_i$ represents an i-order quadrature component of the reference signal obtained after the synchronization, $I_j$ represents a j-order in-phase component of the reference signal obtained after the synchronization, $Q_j$ represents a j-order quadrature component of the reference signal obtained after the synchronization, $S_i$ is an autocorrelation coefficient, $C_{ij}$ is a cross coefficient, $nC_{ij}$ is a negative cross coefficient, and DC represents a direct current term, wherein i and j are natural numbers, i≤n, j≤n, and i≠j.

18. The integrated circuit according to claim 13, comprising:

multiple main channels; and a main switch configured to select one of the multiple main channels as the first main channel.

19. The integrated circuit according to claim 13, wherein the integrated circuit further comprises:

an oscillator multiplexed by the first diversity receiving channel and the first main receiving channel.

* * * * *